United States Patent
Morioka et al.

(10) Patent No.: US 9,931,922 B2
(45) Date of Patent: Apr. 3, 2018

(54) SEALING MEMBER OF DOOR FOR CAR

(71) Applicant: Nishikawa Rubber Co., Ltd., Hiroshima (JP)

(72) Inventors: Masahiro Morioka, Hiroshima (JP); Atushi Fukuta, Hiroshima (JP)

(73) Assignee: Nishikawa Rubber Co., Ltd., Hiroshima (JP)

( * ) Notice: Subject to any disclaimer, the term of this patent is extended or adjusted under 35 U.S.C. 154(b) by 0 days.

(21) Appl. No.: 15/169,178

(22) Filed: May 31, 2016

(65) Prior Publication Data
US 2017/0001503 A1 Jan. 5, 2017

(30) Foreign Application Priority Data
Jun. 30, 2015 (JP) .................................. 2015-131138

(51) Int. Cl.
| | |
|---|---|
| B60J 10/27 | (2016.01) |
| B60J 10/32 | (2016.01) |
| B60J 10/40 | (2016.01) |
| F16J 9/06 | (2006.01) |

(52) U.S. Cl.
CPC ............... B60J 10/27 (2016.02); B60J 10/32 (2016.02); B60J 10/40 (2016.02); *F16J 9/068* (2013.01)

(58) Field of Classification Search
CPC .................................. B60J 10/23; B60J 10/26
See application file for complete search history.

(56) References Cited

U.S. PATENT DOCUMENTS

| | | | | | |
|---|---|---|---|---|---|
| 4,627,145 | A | * | 12/1986 | Niemanns ................ | B60J 10/24 29/450 |
| 4,950,019 | A | * | 8/1990 | Gross ..................... | B60J 10/265 296/201 |
| 5,743,047 | A | * | 4/1998 | Bonne ..................... | B60J 10/00 49/441 |
| 6,968,649 | B2 | * | 11/2005 | Van Den Oord ...... | B60J 10/248 49/490.1 |
| 7,478,863 | B2 | * | 1/2009 | Krause .................... | B60J 10/79 296/1.08 |
| 8,205,389 | B1 | * | 6/2012 | Kesh ...................... | B60J 10/235 49/440 |
| 8,919,846 | B2 | * | 12/2014 | Maass .................... | B60J 10/042 296/1.08 |
| 9,027,284 | B2 | * | 5/2015 | Murree ................... | E06B 7/2314 49/441 |
| 9,114,693 | B2 | * | 8/2015 | Prater .................... | B60J 10/0091 |
| 9,623,739 | B2 | * | 4/2017 | Fukuta ................... | B60J 10/32 |

(Continued)

FOREIGN PATENT DOCUMENTS

JP        2012-131304 A        7/2012

*Primary Examiner* — Katherine W Mitchell
*Assistant Examiner* — Catherine A Kelly
(74) *Attorney, Agent, or Firm* — Alston & Bird LLP

(57) ABSTRACT

When an insertion groove, into which various parts are inserted, is formed on a sealing member, the present disclosure may maintain a width of an opening of the insertion groove greater than or equal to a predetermined width, facilitating the insertion. A sealing member 30 includes an insertion groove S opening toward an outside of a compartment. A protruding portion 36*b* is formed on a side face S1 of the insertion groove S, and protrudes toward another side face S2. The protruding portion 36*b* is connected to the other side face R2 via a connecting portion 36*c* smaller in strength.

3 Claims, 9 Drawing Sheets

OUTSIDE OF COMPARTMENT ←      → INSIDE OF COMPARTMENT

(56) References Cited

U.S. PATENT DOCUMENTS

| | | | |
|---|---|---|---|
| 2008/0030046 A1* | 2/2008 | Krause | B60J 10/79 |
| | | | 296/146.2 |
| 2017/0001504 A1* | 1/2017 | Takeda | B60J 10/27 |
| 2017/0001505 A1* | 1/2017 | Fukuta | B60J 10/32 |

* cited by examiner

OUTSIDE OF COMPARTMENT ←          → INSIDE OF COMPARTMENT

OUTSIDE OF COMPARTMENT ←        → INSIDE OF COMPARTMENT

SEALING MEMBER OF DOOR FOR CAR

CROSS-REFERENCE TO RELATED APPLICATION

This application claims priority to Japanese Patent Application No. 2015-131138 filed on Jun. 30, 2015, the disclosure of which including the specification, the drawings, and the claims are hereby incorporated by reference in its entirety.

BACKGROUND

The present disclosure relates to a sealing member provided to a door for a car and, in particular, belongs to a technical field of a construction which involves insertion of various kinds of parts such as a trim strip and a door flange.

Doors provided to a side of a car include a door having a window frame holding an edge portion of a window glass, and a door having no window frame; that is, a door having a frameless window. The door having the window frame is provided with a sealing member for sealing a gap between the edge portion of the window frame and an edge portion of an opening portion of the body of the car.

A known example of the construction of the door with this kind of window frame is disclosed in Japanese Unexamined Patent Publication No. 2012-131304. The window frame in the patent publication has an upper frame portion extending along a roof of the body. The upper edge portion is provided with a door flange protruding toward the outside of the compartment. The door flange has a sealing member provided from the outside of the compartment to cover the door flange. Such a construction—the sealing member is provided from the outside of the compartment to cover up the door flange on the upper frame portion—is referred to as a "hidden type".

The sealing member disclosed in the patent publication includes an insertion groove opening toward the outside of the compartment, and continuously formed from a front portion toward a rear portion of the upper frame portion. The insertion groove receives a securing leg of a trim strip so that the trim strip is secured to the sealing member.

Moreover, the door flange, also formed on the door other than the trim strip, is inserted into the sealing member of the door for the car. Insertion of this door flange allows the sealing member to be secured to the door.

SUMMARY

Moreover, as disclosed in the patent publication, an elongated trim strip is secured between the front portion and the rear portion of the upper frame portion in order to improve the appearance of the window frame of the door. Here, a manufacturing challenge is how to secure the trim strip to the hidden-type sealing member.

Here, typically, the window frame of a front door for the car has an upper edge portion formed to bend round such that the upper edge portion is positioned lower as extending further toward the front. Consequently, the upper edge portion is shaped to have a bent portion. Meanwhile, the sealing member is shaped liner. When secured to the upper edge portion of the window frame, this liner-shaped sealing member is forcibly bent to fit into the shape of the bent portion of the upper edge portion. Here, the sealing member cannot conform to the difference between an outer peripheral length and an inner peripheral length of the bent portion of the upper edge portion. The resulting sealing member is forcibly bent. Forcibly bending the sealing member inevitably closes an opening of an insertion groove into which the sealing member is inserted. As a result, the closed opening causes a problem; that is, inserting the securing leg of the trim strip becomes difficult, followed by degrading workability when the trim strip is fastened to the sealing member.

Moreover, when the door flange is inserted, the sealing member has to be bent and secured as described above. Thus, the problem is that the opening of the insertion groove is closed and, as a result, inserting the door flange can be difficult.

Furthermore, the insertion groove of the sealing member could possibly be closed on its own even in a non-bent portion of the sealing member. This case also makes it difficult to insert various kinds of parts into the insertion groove.

The present disclosure is conceived in view of the above problems. When an insertion groove, into which various parts are inserted, is formed on a sealing member, the present disclosure successfully maintains a width of an opening of the insertion groove greater than or equal to a predetermined width and provides high workability in the insertion.

In the present disclosure, an insertion groove, into which various parts are inserted, is formed on a sealing member. A protruding portion is formed on a side face of the insertion groove. The protruding portion is connected to an other side face via a connecting portion smaller in strength.

A first aspect of the present disclosure is directed to a sealing member to be secured to a door for a car. The sealing member includes an insertion groove, formed on the sealing member, into which a part is inserted; and a protruding portion formed on a side face of the insertion groove, protruding toward an other side face of the insertion groove, and connected to the other side face via a connecting portion smaller in strength than the protruding portion.

In accordance with these features, the protruding portion formed on the side face of the insertion groove is connected to the other side face of the insertion groove via the connecting portion. Thus, even if external force is applied to narrow the width of an opening of the insertion groove when parts including a trim strip and a door flange are inserted, the protruding portion functions to reliably brace itself between and against the side face and the other side face. Such a function keeps the width of the opening of the trim strip insertion groove from narrowing, and maintains the opening of the trim strip insertion groove to be open. As a result, various kinds of parts may be easily inserted into the insertion groove. When the various kinds of parts are inserted into the insertion groove, the force applied by the insertion of the various parts may easily break the connecting portion connecting the protruding portion or debond the connecting portion from the other side face, because the connecting portion is smaller in strength than the protruding portion. This reduces a risk that the connecting portion blocks the insertion of the various parts.

In a second aspect of the present disclosure according to the first aspect, the sealing member is secured to a door flange, and covers up the door flange at least from an outside of a compartment of the car, the door flange protruding from a window frame of the door toward the outside of the compartment, wherein the insertion groove is formed to open toward the outside of the compartment, the part includes a trim strip having a securing leg to be inserted into the insertion groove from the outside of the compartment, and the protruding portion engages with an engaging step portion included in the securing leg of the trim strip.

In accordance with these features, securing the sealing member to the door flange implements a door including a hidden-type sealing member. Then, when the trim strip is secured to this sealing member, the securing leg of the trim strip is inserted into the insertion groove of the sealing member so that the protruding portion engages with the engaging step portion of the securing leg. Specifically, such engagement may effectively reduce a risk that the trim strip comes off the sealing member, using the protruding portion for maintaining the width of the opening of the insertion groove.

In a third aspect of the present disclosure according to the second aspect, the protruding portion is formed to be positioned deeper into the insertion groove as extending further toward a protruding tip portion of the protruding portion.

In accordance with this feature, the tip of the securing leg of the trim strip is guided deeper into the insertion groove by the protruding portion when the securing leg is inserted into the insertion groove of the sealing member.

In a fourth aspect of the present disclosure according to the first aspect, the connecting portion includes a thin portion formed when the protruding portion is formed, the thin portion being integrally formed of the protruding tip portion of the protruding portion.

In accordance with this feature, the connecting portion includes a thin portion formed when, for example, the sealing member is extrusion-molded, and the thin portion is integrally formed as the protruding portion is formed. Hence, the connecting portion is easily obtained.

In a fifth aspect of the present disclosure according to the first aspect, the sealing member includes a portion made of an elastic material, and a core made of a material different from the elastic material, the protruding portion includes the elastic material, and the connecting portion connects the protruding portion to the core.

In accordance with these features, the sealing member including the core is reinforced by the core. Then, the protruding portion including the elastic material is connected to the core including a material different from the elastic material. This allows the force applied during the insertion of the securing leg to debond the connecting portion from the core.

According to the first aspect, the protruding portion is formed on the side face of the insertion groove, and connected to the other side face of the insertion groove via the connecting portion having smaller strength. Such a feature may keep the width of the opening of the insertion groove greater than or equal to a predetermined width, and provide high workability in fastening various parts such as a trim strip.

According to the second aspect, the protruding portion engages with the engaging step portion formed on the securing leg of the trim strip. Such a feature may effectively reduce the risk that the trim strip comes off the sealing member, using the protruding portion for maintaining the width of the opening of the insertion groove.

According to the third aspect, the protruding portion is formed to be positioned deeper into the insertion groove of the sealing member as extending further toward the protruding tip of the protruding portion. Such a feature allows the tip of the securing leg of the trim strip to be guided deeper into the insertion groove by the protruding portion when the securing leg is inserted into the insertion groove, which contributes to smooth insertion of the securing leg.

According to the fourth aspect, the connecting portion includes a thin portion formed when the protruding portion is formed, and the thin portion is integrally formed of the protruding portion. Such a feature allows the connecting portion to be easily obtained.

According to the fifth aspect, the protruding portion including the elastic material is connected to the core by the connecting portion. Such a feature allows the force applied during the insertion of the securing leg to debond the connecting portion from the core.

DETAILED DESCRIPTION

Embodiments of the present disclosure will be described in detail below, with reference to the drawings. Note that the preferable embodiments below are essentially mere examples, and are not intended to limit the scopes of the present disclosure, of the application of the present disclosure, or of the use of the present disclosure.

First Embodiment

Configuration of Door

Figure 1:
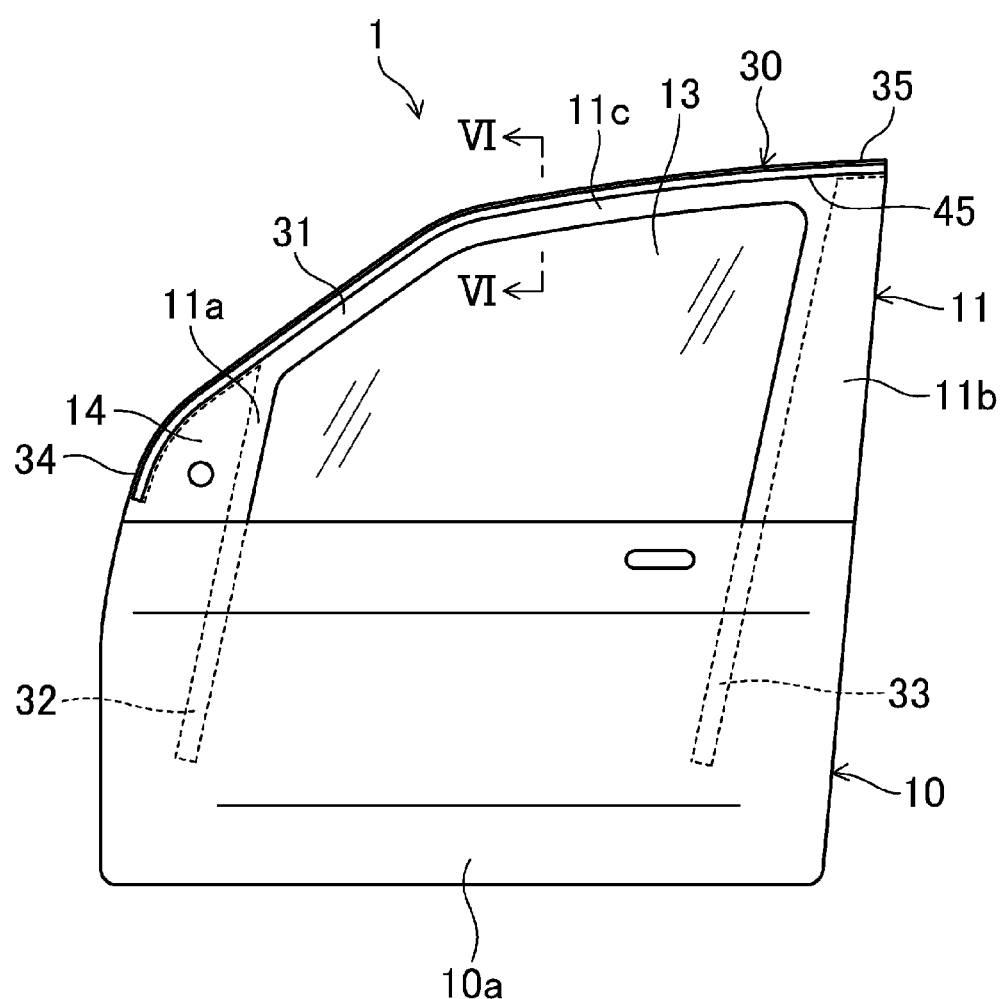
FIG. 1 is a side view of a front door, for a car, having a construction for securing a trim strip according to a first embodiment.
Figure 2:
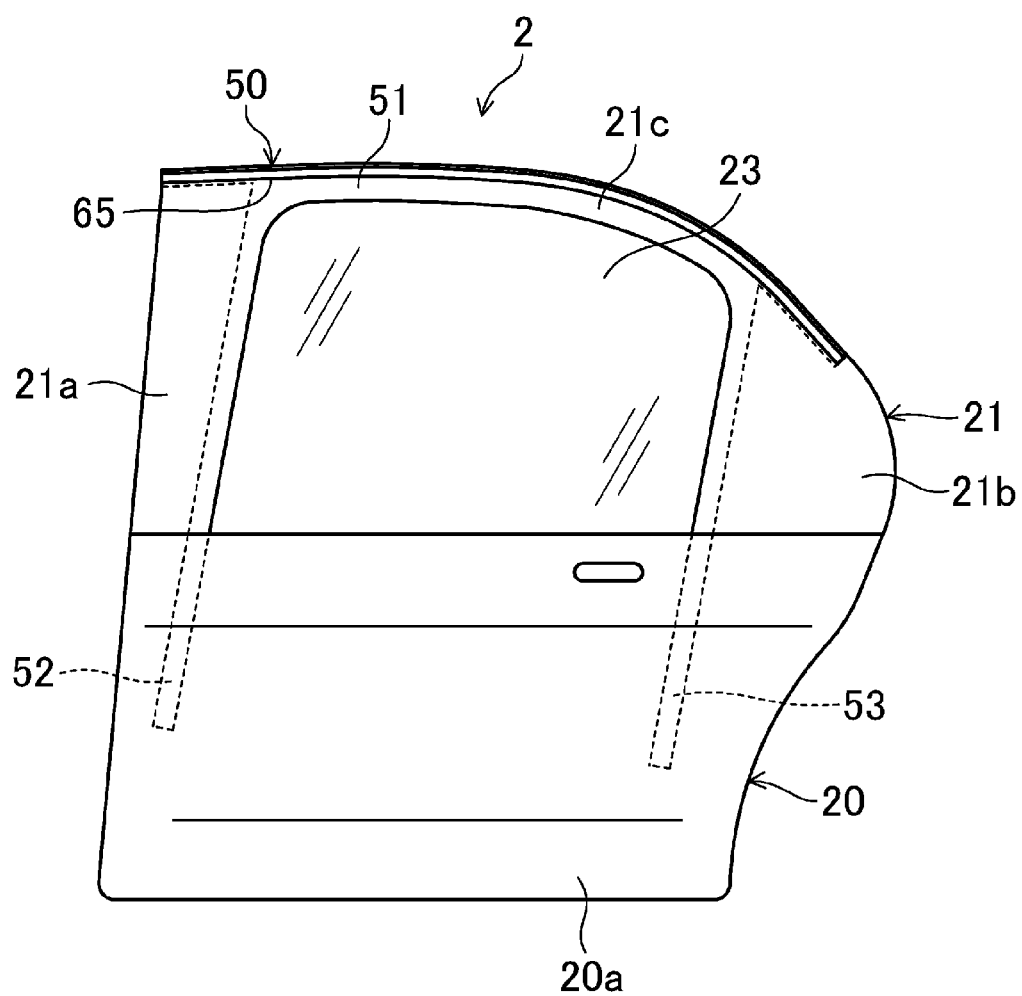
FIG. 2 is a side view of a rear door, for the car, having the construction for securing a trim strip according to the first embodiment.

FIG. 1 is a side view of a front door 1, for a car, provided with a sealing member 30 for the door of the car, according to a first embodiment of the present disclosure. FIG. 2 is a side view of a rear door 2, for the car, provided with a sealing member 50 for the door of the car, according to the first embodiment of the present disclosure. The front door 1 and the rear door 2 are arranged to a side of the car (not shown). The front door 1 opens and closes an opening portion (not shown) defined in the front, and to the side, of the car. The rear door 2 opens and closes an opening portion (not shown) defined in the rear, and to the side, of the car.

The front door 1 includes a door body 10 to be an approximately lower half of the front door 1, and a window frame 11 to be an approximately upper half of the front door 1. Even though not shown, a front end portion of the door body 10 is secured to a pillar of the car body via a hinge having a vertically extending rotational pin. The door body 10 includes an inner panel (not shown) and an outer panel 10a made of, for example, a steel plate. The door body 10 houses a window glass 13 which rises and falls, and a window regulator (not shown) to raise and lower the window glass 13.

Figure 7:
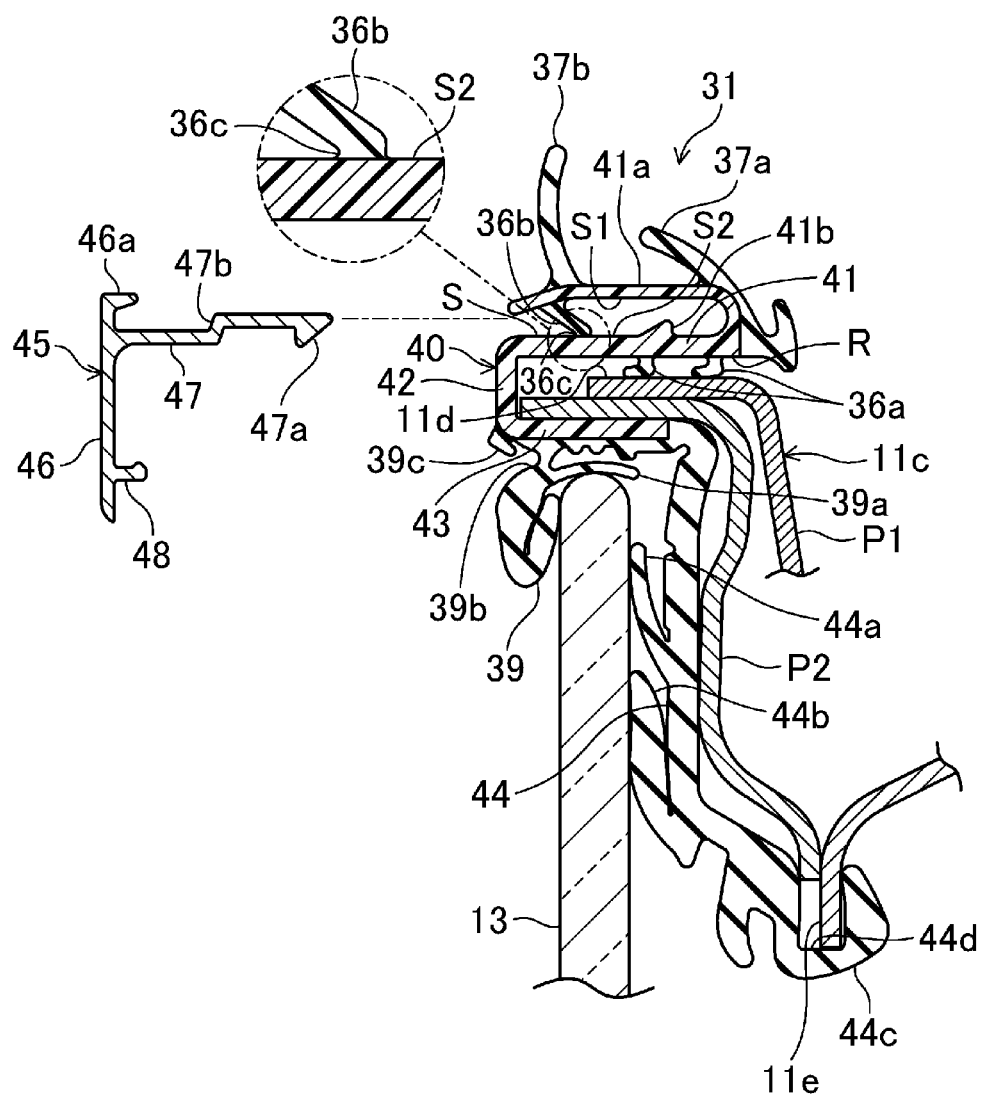
FIG. 7 is an illustration in FIG. 6 before the trim strip is secured.

The window frame 11 functions as a sash to hold an edge portion of the window glass 13. As illustrated in FIG. 7, the window frame 11 according to these embodiments is a combination of a first panel member P1 and a second panel member P2 made of, for example, a pressed metal plate. However, the window frame 11 may be made by roll forming, for example.

As illustrated in FIG. 1, the window frame 11 includes a front longitudinal frame edge portion 11a, a rear longitudinal frame edge portion 11b, and a frame upper edge portion 11c. The front longitudinal frame edge portion 11a extends upward from an upper front edge of the door body 10. The rear longitudinal frame edge portion 11b extends upward from an upper rear edge of the door body 10. The rear longitudinal frame edge portion 11b extends above the front longitudinal frame edge portion 11a. The frame upper edge portion 11c extends between a top end of the front longitudinal frame edge portion 11a and a top end of the rear longitudinal frame edge portion 11b, in the front-rear direction along an edge portion (not shown) of a roof of the body.

In front of the front longitudinal frame edge portion 11a of the window frame 11, a door mirror securing portion 14 is provided to extend upward the door body 10. A not-shown door mirror is secured to the door mirror securing portion 14. An upper edge portion of the door mirror securing portion 14 is formed to lead to a front end portion of the frame upper edge portion 11c of the window frame 11. The upper end portion slopes downward as extending toward the front.

As illustrated in FIG. 7, a door flange 11d is provided to the frame upper edge portion 11c of the window frame 11, and protruding toward the outside of the compartment. Edge portions of the first panel member P1 and the second panel member P2, included in the window frame 11, are shaped to extend toward the outside of the compartment, and vertically overlap with each other to form the door flange 11d. In the door flange 11d, the edge portion of the first panel member P1 is positioned above the edge portion of the second panel member P2. Moreover, the edge portion of the first panel member P1 is positioned slightly more inwardly toward the compartment than the edge portion of the second panel member P2. However, the positioning of the edges shall not be limited to this. The front portion of the door flange 11d continuously extends to the front portion of the door mirror securing portion 14.

Furthermore, a sealing member fitting plate portion 11e is provided below the frame upper edge portion 11c to extend downward. Edge portions of the first panel member P1 and the second panel member P2, included in the window frame 11, are shaped to extend downward and overlap with each other in the inside-outside direction of the compartment to form the sealing member fitting plate portion 11e.

Figure 5:
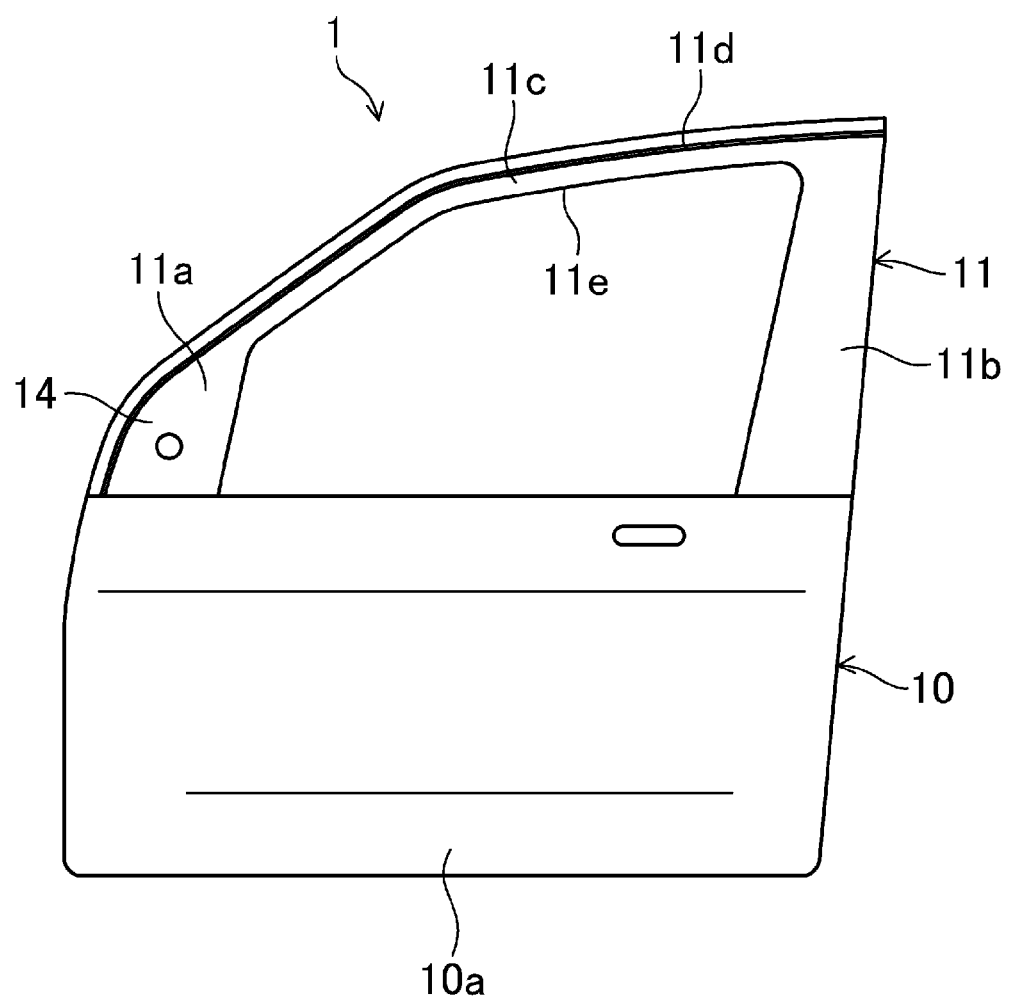
FIG. 5 is a side view of the front door with the sealing member and the trim strip removed.

As illustrated in FIG. 5, the frame upper edge portion 11c is bent in the middle in the front-rear direction when seen from the side. Then, in the frame upper edge portion 11c, a portion before the bent portion slopes downward and extends toward the front. Moreover, in the frame upper edge portion 11c, a portion behind the bent portion slopes at a more obtuse angle than the sloping angle of the front portion and extends toward the bent portion. Note that the shape of the frame upper edge portion 11c shall not be limited to that illustrated in FIG. 5. The frame upper edge portion 11c may bend round upward overall. The position of the bent portion and the sloping angle of the frame upper edge portion 11c may be set in any given manner to conform to the shape of the roof of the body.

Figure 6:
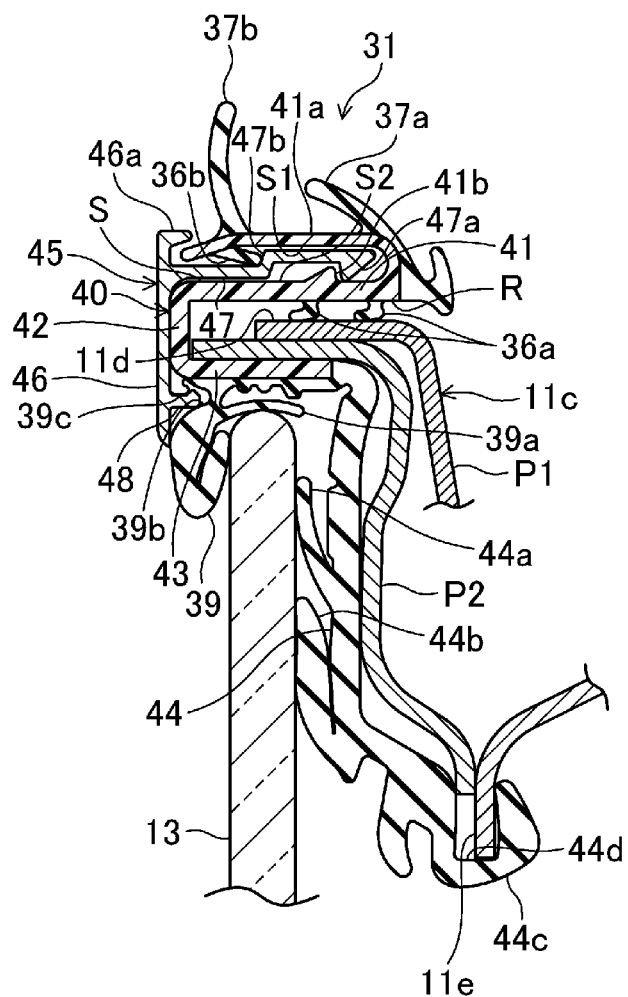
FIG. 6 is a cross-sectional view taken from line VI-VI of FIG. 1.

As illustrated in FIG. 1, the door flange 11d is provided with a sealing member 30. Furthermore, as illustrated in FIG. 6, a trim strip 45 is secured to the sealing member 30 to be positioned outside the compartment with respect to the sealing member 30.

Figure 4:
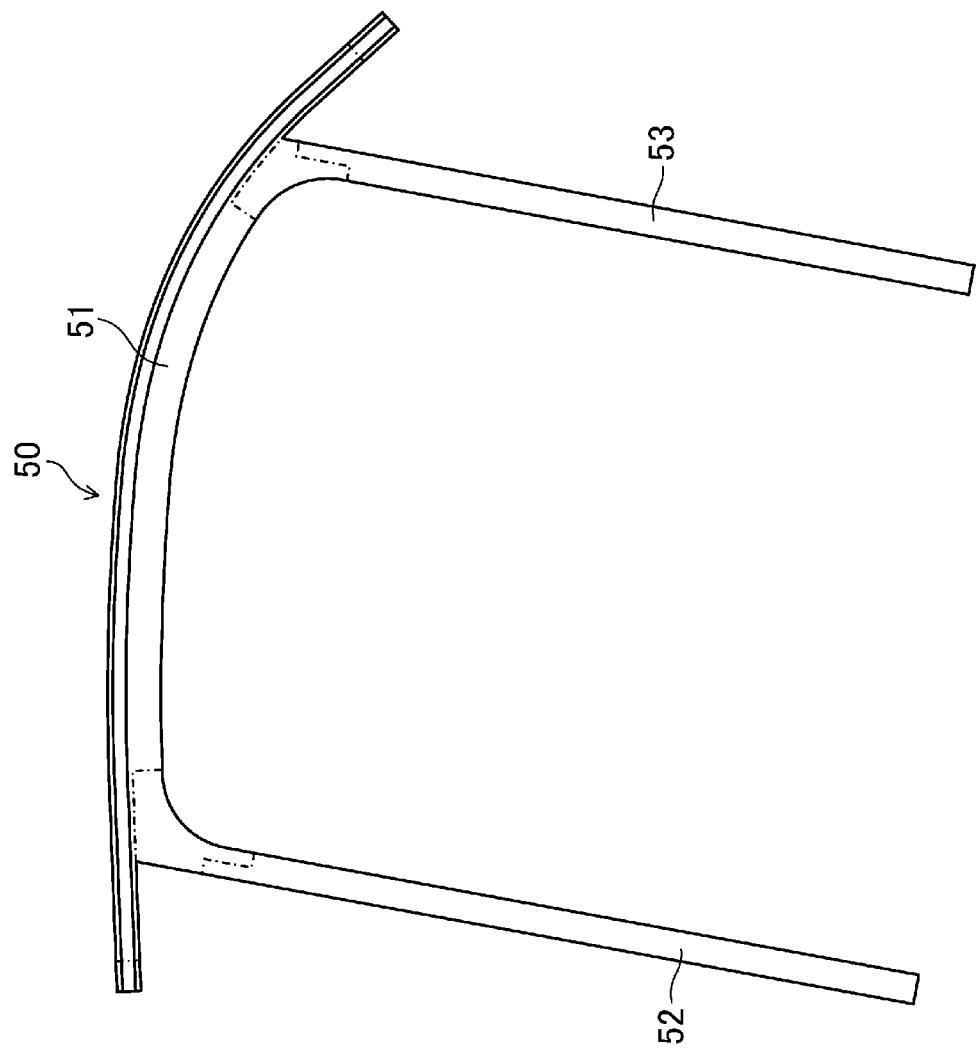
FIG. 4 is a side view of a sealing member provided to the rear door.

Basically, the rear door 2 illustrated in FIG. 2 is the same in construction as the front door 1. Specifically, the rear door 2 includes a door body 20, and a window frame 21 holding an edge portion of a window glass 23. The window frame 21 includes a front longitudinal edge portion 21a, a rear longitudinal edge portion 21b, and an upper edge portion 21c. Then, as illustrated in FIG. 4, the rear door 2 is provided with a sealing member 50. The numerical reference 65 in FIG. 2 denotes a trim strip. The numerical reference 20a denotes an outer panel.

Configuration of Sealing Member

As illustrated in FIG. 7, the sealing member 30 which is referred to as a "hidden type", is provided from the outside of the compartment to cover up the door flange 11d. The sealing member 30 is formed to cover up a top face and a bottom face of the door flange 11d. The sealing member 30 seals a gap between the edge portion of the window frame 11 and the edge portion of the opening portion of the body. The sealing member 30 also seals a gap between the edge portion of the window frame 11 and the edge portion of the window glass 13. The sealing member 30 includes a portion made of a waterproof elastic material such as ethylene-propylene-diene rubber (EPDM) and thermoplastic elastomer olefin (TPO), and a core 40 including a material different from the elastic material. The core 40 may be made of any given material which may include, but not specifically limited to, an aluminum alloy, steel, stainless steel, and hard resin such as resin in which talc and glass fibers are blended together.

Figure 3:
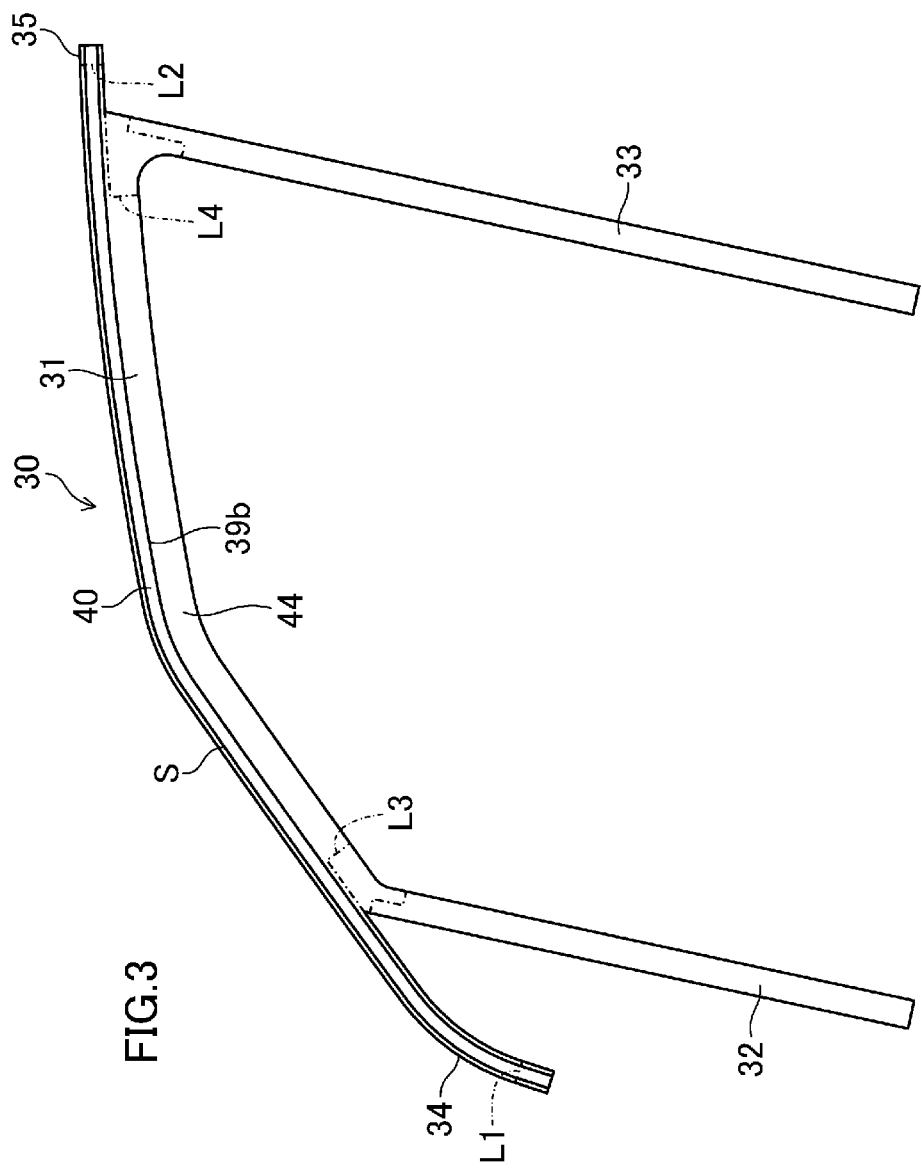
FIG. 3 is a side view of a sealing member provided to the front door.

As illustrated in FIG. 3, the sealing member 30 includes: an upper seal edge portion 31 extending along the upper frame edge portion 11c of the window frame 11; a front longitudinal seal edge portion 32 extending along the front longitudinal frame edge portion 11a of the window frame 11; and a rear longitudinal seal edge portion 33 extending along the rear longitudinal frame edge portion 11b of the window frame 11. The upper seal edge portion 31, the front longitudinal seal edge portion 32, and the rear longitudinal seal edge portion 33 are integrated into one.

Lower portions of the front longitudinal seal edge portion 32 and the rear longitudinal seal edge portion 33 extend into the door body 10 to be positioned near a lower portion of the door body 10 and held by a holding member (not shown) provided inside the door body 10. The front longitudinal seal edge portion 32 and the rear longitudinal seal edge portion 33 extend in the moving direction of the respective front edge portion and rear edge portion of the window glass 13 in rising and falling, so that the front edge portion and the rear edge portion of the window glass 13 are slidably in contact with the front longitudinal seal edge portion 32 and the rear longitudinal seal edge portion 33.

As illustrated in FIG. 3, a front seal portion 34 is continuously provided to the front portion of the upper seal edge portion 31 to extend before the front longitudinal seal edge portion 32. As illustrated FIG. 1, the front seal portion 34 is formed to extend along the upper edge portion of the door mirror securing portion 14. Furthermore, as illustrated in FIG. 3, a rear seal portion 35 is continuously provided to the rear portion of the upper seal edge portion 31 to extend behind the rear longitudinal seal edge portion 33.

The sealing member 30 is a combination of an extrusion-molded portion made by extrusion molding and a die-formed portion made by die forming. As illustrated in FIG. 3, there is a die-formed portion, in the front seal portion 34 of the sealing member 30, below a boundary L1 defined by a dashed-dotted line. Furthermore, there is another die-formed portion, in the rear seal portion 35 of the sealing member 30, behind a boundary L2 defined by a dashed-dotted line. Furthermore, there is another die-formed portion surrounded by a boundary L3 defined by a dashed-dotted line on the border between the upper seal edge portion 31 and the front longitudinal seal edge portion 32 of the sealing member 30. Furthermore, there is another die-formed portion surrounded by a boundary L4 defined by a dashed-dotted line on the border between the upper seal edge portion 31 and the rear longitudinal seal edge portion 33 of the sealing member 30. The extrusion-molded portion is other than the above two die-formed portions.

The upper seal edge portion 31 of the sealing member 30 has a cross-sectional shape as illustrated in FIG. 7. The cross-sectional shape is approximately the same the front end portion through the rear end portion of the upper seal edge portion 31; whereas, cross-sectional shapes of the front seal portion 34 and the rear seal portion 35 are different from the cross-sectional shape of the upper seal edge portion 31.

Specifically, the upper seal edge portion 31 includes a core 40 forming an upper portion of the upper seal edge portion 31 and a plate portion 44 extending downward from the core 40. The core 40 includes: a top plate portion 41 extending inside-outside direction of the compartment along the top face of the door flange 11d; a longitudinal plate portion 42 extending downward from an end portion, of the top plate portion 41, close to the outside of the compartment; and a bottom plate portion 43 extending toward the inside of the compartment along the bottom face of the door flange 11d. Furthermore, the top plate portion 41 has an end portion, to the inside of the compartment, provided with a protruding plate portion 41a protruding upward, and then bending and extending toward the outside of the compartment. The core 40 has an upper portion provided with a trim strip insertion groove S, and a lower portion provided with a door flange insertion groove R. The trim strip insertion groove S is defined by the top plate portion 41 and the protruding plate portion 41a, and open toward the outside of the compartment. The door flange insertion groove R is defined by the top plate portion 41, the longitudinal plate portion 42, and the bottom plate portion 43, and open toward the inside of the compartment.

A portion of the protruding plate portion 41a toward the outside of the compartment extends while sloping downward. Such sloping makes the vertical width of an opening of the trim strip insertion groove S narrower than that of a portion deeper inside the trim strip insertion groove S.

When the door flange 11d is inserted into the door flange insertion groove R included in the lower portion of the core 40, the core 40 fits onto the door flange 11d to be fixed. In the fixed state, the top plate portion 41, the longitudinal plate portion 42, and the bottom plate portion 43 of the core 40 respectively cover up the top face, an outer end portion, and the bottom face of the door flange 11d. Furthermore, the trim strip 45 has a securing leg 47. When the securing leg 47 is inserted into the trim strip insertion groove S included in the upper portion of the core 40, as described below, the trim strip 45 is secured to the sealing member 30.

On a bottom face of the top plate portion 41 in the core 40, two protruding portions 36a, extending in a longitudinal direction of the upper seal edge portion 31, are formed at an interval in the inside-outside direction of the compartment. Made of an elastic material, the protruding portions 36a are flexible, and flex in contact with the door flange 11d while the core 40 fits onto the door flange 11d.

The protruding plate portion 41a of the top plate portion 41 in the core 40 is provided with an inner lip portion 37a and an outer lip portion 37b. The inner lip portion 37a bends round and extends toward the outside of the compartment from an end portion, of the protruding plate portion 41a, close to the inside of the compartment. The outer lip portion 37b bends round and extends upward from an end portion, of the protruding plate portion 41a, close to the outside of the compartment. When the front door 1 is closed, the inner lip portion 37a and the outer lip portion 37b provide a sealing effect by making contact with the edge portion of the opening portion of the body.

Of the two side faces S1 and S2 of the trim strip insertion groove S, the side face S1 (one of the side faces) positioned above has a protruding portion 36b formed near the opening of the trim strip insertion groove S. The protruding portion 36b protrudes toward the side face S2 (the other side face) positioned below. The protruding portion 36b is a portion made of an elastic material. The protruding portion 36b is formed to be positioned deeper into the trim strip insertion groove S (the inside of the compartment), as extending further toward a protruding tip of the protruding portion 36b (extending downward).

The protruding tip portion of the protruding portion 36b is connected to the side face S2 positioned below; that is the top face of the top plate portion 41 in the core 40, through a connecting portion 36c smaller in strength than the protruding portion 36b. The connecting portion 36c includes a thin portion formed when the protruding portion 36b is formed. The thin portion is integrally formed of the protruding tip of the protruding portion 36b. Specifically, the protruding portion 36b becomes thinner toward the tip when formed, since the protruding portion 36b is tapered toward the protruding tip portion. This thin portion may be easily obtained when the protruding portion 36b is formed. The thin portion is formed while making contact with the top face of the top plate portion 41 in the core 40. The resulting thin portion is bonded to the top face of the top plate portion 41 in the core 40. The connecting portion 36c may be weaker than the protruding portion 36b, for example.

The connecting portion 36c is either broken or debonded from the top plate portion 41 of the core 40 when the securing leg 47 of the trim strip 45 is inserted into the trim strip insertion groove S as described below. The connecting portion 36c may be separated either by cohesion failure or interfacial debonding. The securing leg 47 of the trim strip 45 is inserted into the trim strip insertion groove S with a pressing force of 20 kgf applied to every 100 mm in the length of the trim strip 45. Hence, the connecting portion 36c is either broken or debonded. Any given intended force may be set to start breaking or debonding the connecting portion 36c depending on, for example, the thickness of the connecting portion 36c. The force may be lower than the 20 kgf as described above. Beneficially, however, the force may be approximately at least 10 kgf. Beneficially, the force may be 20 kgf or lower because, if the force intended to start breaking or debonding the connecting portion 36c is greater than 20 kgf, such excessive force could cause a trouble in which the trim strip 45 becomes susceptible to deformation.

Moreover, the connecting portion 36c may be provided either continuously or intermittently in the longitudinal direction of the sealing member 30. If the connecting portion 36c is provided intermittently, the protruding portion 36b may be provided to be connected to the side face S2 through multiple points. Beneficially, the connecting portion 36c is intermittently provided, since the connecting portion 36c is easily broken when the protruding portion 36b is pressed by the securing leg 47 of the trim strip 45.

The top face of the top plate portion 41 in the core 40 is provided with a fitting protrusion portion 41b positioned deeper into the trim strip insertion groove S than the protruding portion 36b.

On a lower portion of the bottom plate portion 43 of the core 40, a glass contacting portion 39 made of an elastic material is provided to extend downward. After extending downward, the glass contacting portion 39 is folded toward the inside of the compartment, and formed to have an approximate V-shaped cross section. When a tip of the glass contacting portion 39 makes contact with the edge portion of the window glass 13, a sealing effect is provided. Moreover, the glass contacting portion 39 has a base end portion provided with an extending plate portion 39a extending toward the inside of the compartment. This extending plate portion 39a also makes contact with the edge portion of the window glass 13.

On a lower portion of an exterior face of the glass contacting portion 39, a claw-receiving recessed portion 39b is formed to receive a securing claw 48, which is described later, of the trim strip 45. The claw-receiving recessed portion 39b has an interior surface provided with a hook portion 39c extending toward the inside of the claw-receiving recessed portion 39b. The securing claw 48 of the trim strip 45 is hooked over the hook portion 39c.

The plate portion 44, included in a lower portion of the upper seal edge portion 31 and made of an elastic material, is integrally formed with the bottom plate portion 43 of the core 40 included in an upper portion of the upper seal edge portion 31. Instead of being integrally formed with the bottom plate portion 43, the plate portion 44 may be formed as a separate member and secured to the window frame 11. Note that the upper seal edge portion 31 may be either bent round as illustrated in FIG. 3 or formed liner.

The plate portion 44 is formed to cover, from the outside of the compartment, a portion of the upper frame edge portion 11c below the door flange 11d. The plate portion 44 has a face, to the outside of the compartment, provided with (i) an upper lip portion 44a formed in the vertical middle of the face and (ii) a lower lip portion 44b formed on a lower portion of the face. When the upper lip portion 44a and the lower lip portion 44b make contact with the edge portion of the window glass 13, a sealing effect is provided.

On a lower portion of the plate portion 44, a protruding portion 44c is provided to extend downward. The protruding portion 44c has a fitting groove 44d formed to open upward. The sealing member fitting plate portion 11e of the upper frame edge portion 11c fits in the fitting groove 44d.

Meanwhile, as illustrated in FIG. 3, the front seal portion 34 and the rear seal portion 35 are not provided with the plate portion 44. Accordingly, the front seal portion 34 and the rear seal portion 35 are narrower in width than the upper seal edge portion 31.

Furthermore, as illustrated in FIG. 4, the sealing member 50 of the rear door 2 is similar in structure to the sealing member 30 of the front door 1, and includes a upper seal edge portion 51, a front longitudinal seal edge portion 52, and a rear longitudinal seal edge portion 53.

Configuration of Trim Strip

The trim strip 45 is secured so as to face the outside of the compartment with respect to the sealing member 30. The trim strip 45 is made of, for example, an aluminum alloy to give a metallic touch to the front door 1. Note that the trim strip 45 may also be made of resin. In such a case, a portion of the trim strip 45 facing the outside of the compartment may be plated or provided with a metallic plate so that the trim strip 45 looks metallic.

As illustrated in FIG. 1, the trim strip 45 is an elongated member extending the front end portion of the front seal portion 34 through the rear end portion of the rear seal portion 35 in the sealing member 30. As illustrated in FIGS. 6 and 7, the trim strip 45 includes: a body plate portion 46 extending along the exterior face of the longitudinal plate portion 42 of the core 40; the securing leg 47 protruding toward the inside of the compartment from an upper portion on an interior face, of the body plate portion 46, close to the compartment; and the securing claw 48 protruding toward the inside of the compartment from a lower portion of the interior face, of the body plate portion 46, close to the compartment. The body plate portion 46 has an upper edge portion provided with a bent portion 46a bent toward the inside of the compartment. In this bent portion 46a, an upper end portion of the core 40 is positioned.

The securing leg 47 is a portion to be inserted into the trim strip insertion groove S of the sealing member 30, and formed to extend and arrive close to a bottom portion of the trim strip insertion groove S when inserted. The securing leg 47 has a protruding tip portion (an inserting tip portion) provided with a fitting portion 47a. The fitting portion 47a includes a protruding portion protruding downward from a bottom face of the securing leg 47. This fitting portion 47a hooks over the fitting protrusion portion 41b of the core 40 from the protruding tip portion, and engages with the fitting protrusion portion 41b.

Moreover, the securing leg 47 has a top face including an engaging step portion 47b recessed downward and formed in the middle, of the securing leg 47, along the protrusion. As illustrated in FIG. 6, the protruding portion 36b fits to, and engages with, the engaging step portion 47b while the securing leg 47 is inserted into the trim strip insertion groove S.

As illustrated in FIG. 2, a trim strip 65 of the rear door 2 is similar in configuration to the trim strip 45 of the front door 1, and secured to the rear door 2. The trim strip 65 of the rear door 2 and the trim strip 45 of the front door 1 are continuously arranged with each other when seen from the side.

How to Secure Sealing Member and Trim Strip

Described next is how to secure the sealing member 30 and the trim strip 45. Described first is how to secure the sealing member 30. As illustrated in FIG. 7, in securing the sealing member 30 to the window frame 11, the sealing member 30 is placed outside the compartment with respect to the window frame 11. The opening portion of the door flange insertion groove R in the sealing member 30 is positioned opposite a tip portion of the door flange 11d in the window frame 11. After that, the tip portion of the door flange 11d is inserted into the door flange insertion groove R of the sealing member 30. In a similar manner, the front seal portion 34 of the sealing member 30 is secured to the door mirror securing portion 14, and the rear seal portion 35 is secured to an upper end portion of the rear longitudinal frame edge portion 11b. Lower portions of the front longitudinal seal edge portion 32 and the rear longitudinal seal edge portion 33 may be inserted later into the door body 10.

Moreover, the sealing member fitting plate portion 11e of the upper frame edge portion 11c is fitted into the fitting groove 44d provided to a lower portion of the sealing member 30, so that the plate portion 44 of the sealing member 30 is fixed to the window frame 11.

When secured to the window frame 11, the sealing member 30 is forcibly bent to fit into the shape of the bent portion of the frame upper edge portion 11c in the window frame 11. As a result, external force is applied to narrow the width of the opening of the trim strip insertion groove S. Here, the protruding portion 36b is formed on the side face S1 in the upper portion of the trim strip insertion groove S in the sealing member 30. The tip portion of this protruding portion 36b is connected to the side face S2 in the lower portion of the trim strip insertion groove S. Hence, the protruding portion 36b functions to reliably brace itself between and against the side face S1 and the side face S2. Such a function keeps the width of the opening of the trim strip insertion groove S from narrowing, and maintains the opening of the trim strip insertion groove S to be open.

Such an opening allows a worker to easily insert the securing leg 47 of the trim strip 45 into the opening of the trim strip insertion groove S in the sealing member 30. When the securing leg 47 of the trim strip 45 is inserted into the opening of the trim strip insertion groove S and pressing force is applied along the insertion, the securing leg 47 presses the protruding portion 36b. This pressing force easily breaks the connecting portion 36c, or debonds the connecting portion 36c from the top plate portion 41. Such a feature reduces a risk that the connecting portion 36c blocks the insertion of the securing leg 47 of the trim strip 45.

When the securing leg 47 of the trim strip 45 is thoroughly inserted, the fitting portion 47a hooks over and fits onto the fitting protrusion portion 41b of the core 40, from the protruding tip. Moreover, the protruding portion 36b fits onto and engages with the engaging step portion 47b. Furthermore, when the securing claw 48 of the trim strip 45 is inserted into the claw-receiving recessed portion 39b of the sealing member 30, the securing claw 48 of the trim strip 45 hooks over the hook portion 39c. This makes the trim strip 45 difficult to come off.

Effects of First Embodiment

As can be seen, the sealing member 30 according to the first embodiment is provided with the protruding portion 36b formed on the side face S1 in the upper portion of the trim strip insertion groove S, and the protruding portion 36b is connected to the side face S2 in the lower portion of the trim strip insertion groove S via the connecting portion 36c having smaller strength. Such features successfully maintain the width of the opening of the trim strip insertion groove S greater than or equal to a predetermined width, and provide high workability when the trim strip 45 is fastened.

Moreover, the protruding portion 36b engages with the engaging step portion 47b formed on the securing leg 47 of the trim strip 45. Such a feature effectively reduces the risk that the trim strip 45 comes off the sealing member 30, using the protruding portion 36b for maintaining the width of the opening of the trim strip insertion groove S.

Furthermore, the protruding portion 36b is formed to be positioned deeper into the trim strip insertion groove S as extending further toward the protruding tip of the protruding portion 36b. When the securing leg 47 of the trim strip 45 is inserted into the trim strip insertion groove S, such a feature allows the protruding portion 36b to guide the tip of the securing leg 47 deeper into the trim strip insertion groove S, which contributes to smooth insertion of the securing leg 47.

In addition, the connecting portion 36c includes a thin portion integrally formed when the protruding portion 36b is formed. Such a feature allows the connecting portion 36c to be easily obtained.

Note that, in the first embodiment, the protruding portion 36b formed on the side face S1 in the upper portion of the trim strip insertion groove S. Instead of the side face S1, the protruding portion 36b may be formed on the side face S2 in the lower portion of the trim strip insertion groove S, and connected to the side face S1 by the connecting portion 36c.

Second Embodiment

Figure 8:
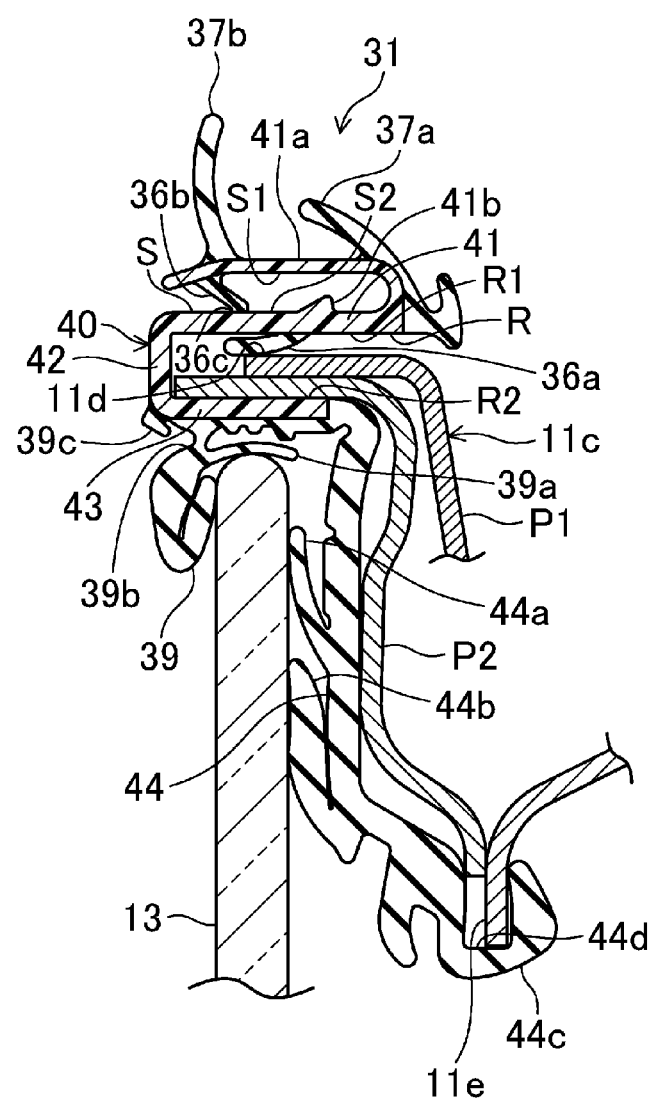
FIG. 8 is an illustration in FIG. 6 according a second embodiment.
Figure 9:
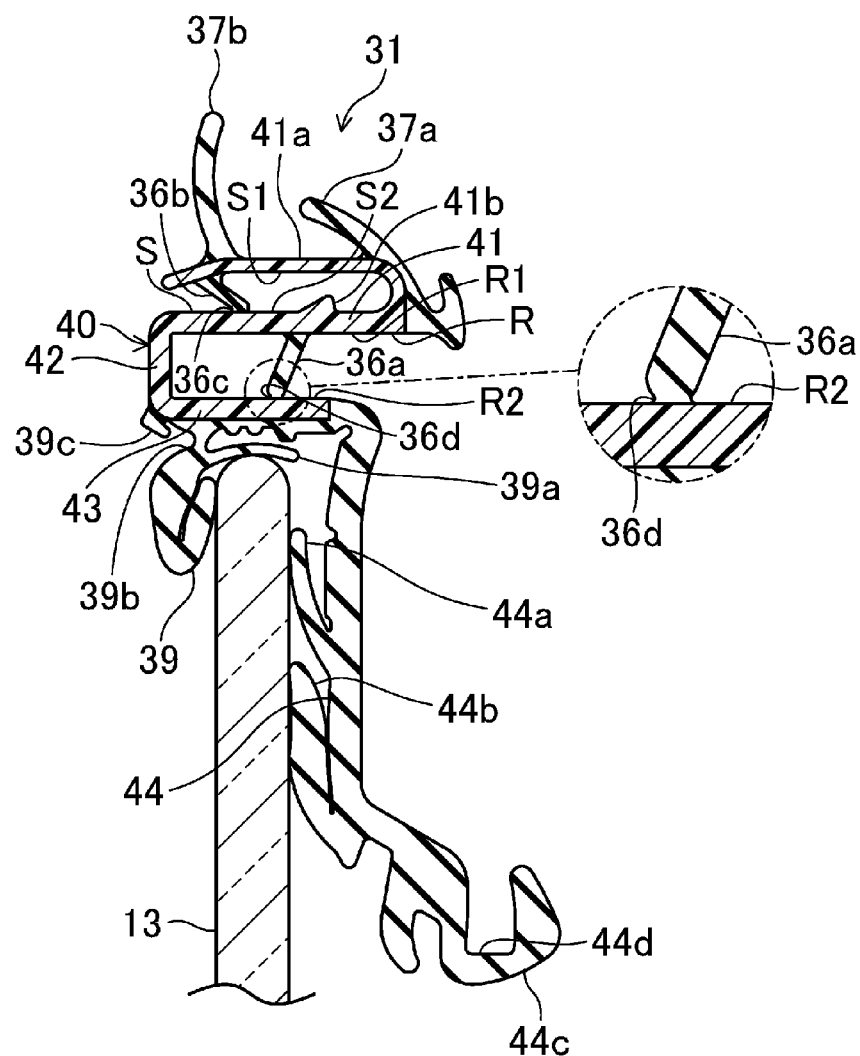
FIG. 9 is an illustration in FIG. 8 before a door flange is inserted.

FIGS. 8 and 9 illustrate features of a second embodiment according to the present disclosure. This second embodiment is different from the first embodiment in the configuration of the protruding portion 36a formed in the door flange insertion groove R. Other than the protruding portion 36a, the first and second embodiments are the same in construction. Thus, the same elements between the first and second embodiments share the same reference signs, and the description of those elements are omitted. Described below are the elements different from those in the first embodiment.

Specifically, as illustrated in FIG. 9, the door flange insertion groove R has a side face R1 in its upper portion, and the side face R1 is provided with a protruding portion 36a protruding toward a side face R2 included in a lower portion of the door flange insertion groove R. The protruding portion 36a is connected to the side face R2 via a connecting portion 36d smaller in strength than the protruding portion 36a. Made of an elastic material, the protruding portion 36a is formed to be positioned deeper into the door flange insertion groove R (the outside of the compartment), as extending further toward a protruding tip of the protruding portion 36a (extending downward). The connecting portion 36d includes a thin portion formed when the protruding portion 36a is formed. The thin portion is integrally formed of the protruding tip portion of the protruding portion 36a. This thin portion bonds to a top face of the bottom plate portion 43 in the core 40.

The connecting portion 36d is either broken or debonded from the bottom plate portion 43 of the core 40 when the door flange 11d is inserted into the door flange insertion groove R. The connecting portion 36d may be debonded either by cohesion failure or interfacial debonding. The door flange 11d is inserted into the door flange insertion groove R with a pressing force of 20 kgf applied to every 100 mm in the length of the door flange 11d. Hence, the connecting portion 36d is either broken or debonded. Any given intended force is set to start breaking or debonding the connecting portion 36d depending on, for example, the thickness of the connecting portion 36d. The force may be lower than the 20 kgf as described above. Beneficially, however, the force may be at least 10 kgf. Beneficially, the force may be 20 kgf or lower because, if the force intended to start breaking or debonding the connecting portion 36d is greater than 20 kgf, workability could be degraded.

Moreover, the connecting portion 36d may be provided either continuously or intermittently in the longitudinal direction of the sealing member 30. If the connecting portion 36d is provided intermittently, the protruding portion 36a may be provided to be connected to the side face R2 through multiple points.

In the second embodiment, the protruding portion 36a is formed on the side face R1 in the upper portion of the door flange insertion groove R, and the protruding portion 36a is connected to the side face R2 in the lower portion of the door flange insertion groove R via the connecting portion 36d having smaller strength. Such features successfully maintain the width of an opening of the door flange insertion groove R greater than or equal to a predetermined width even if the sealing member 30 is bent before insertion of the door flange 11d, and provide high workability when the door flange 11d is inserted into the door flange insertion groove R.

Note that, in the second embodiment, the protruding portion 36a is formed on the side face R1 in the upper portion of the door flange insertion groove R. Instead of being formed on the side face R1, the protruding portion 36a may be formed on the side face R2 in the lower portion of the door flange insertion groove R, and connected to the side face R1 by the connecting portion 36d.

Moreover, the present disclosure may be widely applicable to any structure in which various parts other than the trim strip 45 and the door flange 11d are inserted into an insertion groove formed on the sealing member 30.

The above embodiments are mere examples in all respects, and shall not be limited in interpretation. In addition, all the changes, including the shape, to the equivalents in the claims shall be within the scope of the present disclosure.

As can be seen, the present disclosure may be applicable when a trim strip is secured to a sealing member, or a sealing member is secured to a door flange.

What is claimed is:

1. A sealing member to be secured to a door for a car, the sealing member being secured to a door flange and covering up the door flange at least from an outside of a compartment of the car, the door flange protruding from a window frame of the door toward the outside of the compartment, the sealing member comprising:
   a portion made of an elastic material;
   a core made of a material different from the elastic material;
   an insertion groove, formed on the sealing member, into which one of the door flange or a trim strip is inserted; and
   a protruding portion made of the elastic material,
   wherein the protruding portion:
      is formed on a side face and near an opening of the insertion groove,
      protrudes toward an other side face of the insertion groove,
      is formed at an angle relative to the side face such that a tip portion of the protruding portion protrudes toward the other side face of the insertion groove against and further away from an opening of the insertion groove than a base portion of the protruding portion, and
      is directly connected to the core, including the other side face, via a connecting portion smaller in strength than the protruding portion such that insertion of the door flange or the trim strip into the insertion groove breaks the connecting portion so the protruding portion does not connect the side face to the other side face.

2. The sealing member of claim 1, wherein:
   the insertion groove is formed to open toward the outside of the compartment,
   the trim strip has a securing leg to be inserted into the insertion groove from the outside of the compartment, and
   the protruding portion engages with an engaging step portion included in the securing leg of the trim strip.

3. The sealing member of claim 1, wherein
   the connecting portion includes a thin portion formed when the protruding portion is formed, the thin portion being integrally formed with the protruding tip portion of the protruding portion.

* * * * *